(12) United States Patent
Kroll et al.

(10) Patent No.: US 9,616,518 B2
(45) Date of Patent: Apr. 11, 2017

(54) FEED-THROUGH

(71) Applicant: Schott AG, Mainz (DE)

(72) Inventors: Frank Kroll, Landshut (DE); Helmut Hartl, Vienna (AT); Andreas Roters, Mainz (DE); Hauke Esemann, Woerrstadt (DE); Dieter Goedeke, Bad Soden (DE); Ulf Dahlmann, Gau-Odernheim (DE); Sabine Pichler-Wilhelm, Landshut (DE); Martin Landendinger, Rottenburg (DE); Linda Johanna Backnaes, Landshut (DE)

(73) Assignee: Schott AG, Mainz (DE)

( * ) Notice: Subject to any disclaimer, the term of this patent is extended or adjusted under 35 U.S.C. 154(b) by 716 days.

(21) Appl. No.: 13/967,870

(22) Filed: Aug. 15, 2013

(65) Prior Publication Data
US 2013/0337316 A1 Dec. 19, 2013

Related U.S. Application Data

(63) Continuation of application No. PCT/EP2012/000698, filed on Feb. 17, 2012.

(30) Foreign Application Priority Data

Feb. 18, 2011 (DE) .......... 10 2011 011 705
Feb. 25, 2011 (DE) .......... 10 2011 012 430
(Continued)

(51) Int. Cl.
*H01M 2/02* (2006.01)
*B23K 15/00* (2006.01)
(Continued)

(52) U.S. Cl.
CPC .......... *B23K 15/0093* (2013.01); *B23K 26/32* (2013.01); *C03C 3/19* (2013.01);
(Continued)

(58) Field of Classification Search
CPC .... B23K 15/0093; B23K 26/32; C03C 27/02; C03C 29/00; C03C 3/19; C03C 4/20;
(Continued)

(56) References Cited

U.S. PATENT DOCUMENTS 961,672 A 6/1910 Barnhurst
3,005,865 A 10/1961 Jonsson
(Continued)

FOREIGN PATENT DOCUMENTS

DE 27 33 948 A1 8/1978
DE 690 23 071 T2 6/1996
(Continued)

OTHER PUBLICATIONS

"Handbook of Batteries", published by David Linden, 2nd issue, McGrawhill, 1995, Chapters 36 & 39 (88 pages).
(Continued)

*Primary Examiner* — Patrick Ryan
*Assistant Examiner* — Ben Lewis
(74) *Attorney, Agent, or Firm* — Taylor IP, P.C.

(57) ABSTRACT

A feed-through, in particular a feed-through which passes through part of a housing, in particular a battery housing, for example made of metal, in particular light metal, for example aluminum, an aluminum alloy, AlSiC, magnesium, an magnesium alloy, titanium, a titanium alloy, steel, stainless steel or high-grade steel. The housing part has at least one opening through which at least one conductor, in particular an essentially pin-shaped conductor, embedded in a
(Continued)

glass or glass ceramic material, is guided. The base body is, for example, an essentially annular-shaped base body.

36 Claims, 8 Drawing Sheets

(30) Foreign Application Priority Data

| Apr. 1, 2011 | (DE) | .................. | 10 2011 015 869 |
|---|---|---|---|
| Jun. 10, 2011 | (DE) | .................. | 10 2011 103 975 |
| Jun. 10, 2011 | (DE) | .................. | 10 2011 103 976 |
| Jul. 7, 2011 | (DE) | .................. | 10 2011 106 873 |

(51) Int. Cl.

| *C03C 3/19* | (2006.01) |
|---|---|
| *C03C 4/20* | (2006.01) |
| *C03C 8/24* | (2006.01) |
| *C03C 29/00* | (2006.01) |
| *H01M 2/06* | (2006.01) |
| *H01M 2/30* | (2006.01) |
| *H01M 10/0525* | (2010.01) |
| *C03C 8/00* | (2006.01) |
| *C03C 27/02* | (2006.01) |
| *H01M 2/24* | (2006.01) |
| *B23K 26/32* | (2014.01) |

(52) U.S. Cl.
CPC .................. *C03C 4/20* (2013.01); *C03C 8/00* (2013.01); *C03C 8/24* (2013.01); *C03C 27/02* (2013.01); *C03C 29/00* (2013.01); *H01M 2/06* (2013.01); *H01M 2/065* (2013.01); *H01M 2/24* (2013.01); *H01M 2/305* (2013.01); *H01M 10/0525* (2013.01); *Y02E 60/122* (2013.01); *Y10T 29/4911* (2015.01); *Y10T 29/49108* (2015.01); *Y10T 29/49115* (2015.01)

(58) Field of Classification Search
CPC ........ C03C 8/00; C03C 8/24; H01M 10/0525; H01M 2/06; H01M 2/065; H01M 2/24; H01M 2/305; Y02E 60/122; Y10T 29/49108; Y10T 29/4911; Y10T 29/49115
See application file for complete search history.

(56) References Cited

U.S. PATENT DOCUMENTS

| 4,212,930 | A |   | 7/1980 | Athearn |   |
|---|---|---|---|---|---|
| 4,217,403 | A | * | 8/1980 | O'Boyle | .............. H01M 6/182 |
|   |   |   |   |   | 429/162 |
| 4,219,362 | A |   | 8/1980 | Colegrove |   |
| 4,358,514 | A |   | 11/1982 | Garoutte et al. |   |
| 4,841,101 | A |   | 6/1989 | Pollock |   |
| 5,015,530 | A |   | 5/1991 | Brow et al. |   |
| 5,262,364 | A |   | 11/1993 | Brow et al. |   |
| 5,773,959 | A |   | 6/1998 | Merritt et al. |   |
| 5,849,434 | A |   | 12/1998 | Miura et al. |   |
| 5,853,914 | A |   | 12/1998 | Kawakami |   |
| 5,874,185 | A |   | 2/1999 | Wang et al. |   |
| 5,900,183 | A |   | 5/1999 | Kronfli et al. |   |
| 5,952,126 | A |   | 9/1999 | Lee et al. |   |
| 6,159,630 | A |   | 12/2000 | Wyser |   |
| 6,344,292 | B1 | * | 2/2002 | Nemoto | .............. H01M 2/1241 |
|   |   |   |   |   | 429/53 |
| 6,475,669 | B2 |   | 11/2002 | Probst et al. |   |
| 7,294,430 | B2 |   | 11/2007 | Wyser |   |
| 7,335,443 | B2 |   | 2/2008 | Magneron |   |
| 7,687,200 | B2 |   | 3/2010 | Jouanneau-Si-Larbi et al. |   |
| 2003/0134194 | A1 | * | 7/2003 | Lasater | ..................... C03C 8/24 |
|   |   |   |   |   | 429/181 |
| 2005/0284919 | A1 | * | 12/2005 | Boyd | .................... B23K 26/032 |
|   |   |   |   |   | 228/219 |
| 2008/0224102 | A1 | * | 9/2008 | Lee | .......................... H01B 1/22 |
|   |   |   |   |   | 252/514 |

FOREIGN PATENT DOCUMENTS

| DE | 101 05 877 A1 | 8/2001 |
|---|---|---|
| DE | 698 04 378 T2 | 10/2002 |
| DE | 699 23 805 T2 | 7/2005 |
| DE | 10 2009 011 182 A1 | 9/2010 |
| DE | 10 2011 012 430 A1 | 8/2012 |
| EP | 0 035 074 A2 | 9/1981 |
| EP | 0 412 655 A2 | 7/1990 |
| EP | 0 885 874 A1 | 5/1998 |
| EP | 0 954 045 A2 | 4/1999 |
| FR | 2 585 185 | 1/1987 |
| JP | 55-117864 A | 9/1980 |
| JP | 11-176399 A | 7/1999 |
| SU | 1 058 909 A1 | 12/1983 |
| WO | 2012/110244 A1 | 8/2012 |

OTHER PUBLICATIONS

R. Gorke, K.J. Leers: Keram.Z.48 (1996), "Automatisierung eines Erhitzungsmikroskops mit Hilfe digitaler Bildverarbeitung", pp. 300-305 (6 pages).
International Search Report dated Jun. 25, 2012 for International Application No. PCT/EP2012/000698 (4 pages).
DIN 51730, Testing of solid fuels—Determination of fusibility of fuel ash, Sep. 2007 (16 pages).
ISO 540, Hard coal and coke—Determination of ash fusibility, International Standard, Fourth edition, Jun. 1, 2008 (20 pages).
DIN CEN/TS 15404, Solid recovered fuels—Methods for the determination of ash melting behaviour by using characteristic temperatures, Nov. 2010 (19 pages).
DIN CEN/TS 15370-1, Solid biofuels—Method for the determination of ash melting behaviour—Part 1: Characteristic termperatures method, Dec. 2006 (12 pages).
Notification Concerning Transmittal of International Preliminary Report on Patentability and Written Decision of the International Searching Authority dated Aug. 29, 2013 for International Application No. PCT/EP2012/000698 (6 pages).

\* cited by examiner

F CONDUCTOR

F HEAD PART

780

782
780
713
709
711

FEED-THROUGH

CROSS REFERENCE TO RELATED APPLICATIONS

This is a continuation of PCT application No. PCT/EP2012/000698, entitled "FEED-THROUGH", filed Feb. 17, 2012, which is incorporated herein by reference.

BACKGROUND OF THE INVENTION

1. Field of the Invention

The present invention relates to a feed-through, in particular to a feed through which passes through a part of a housing, such as a battery cell housing, whereby the housing part has at least one opening through which at least one essentially pin shaped conductor embedded in a glass- or glass ceramic material is guided.

2. Description of the Related Art

Lithium-ion batteries have been known for many years. In this regard we refer you to the "Handbook of Batteries, published by David Linden, 2nd issue, McGrawhill, 1995, chapters 36 and 39".

Various aspects of lithium-ion batteries are described in a multitude of patents, for example, U.S. Pat. No. 961,672; U.S. Pat. No. 5,952,126; U.S. Pat. No. 5,900,183; U.S. Pat. No. 5,874,185; U.S. Pat. No. 5,849,434; U.S. Pat. No. 5,853,914 and U.S. Pat. No. 5,773,959.

Lithium-ion batteries, for example for applications in the automobile industry, generally feature a multitude of individual battery cells which are generally connected in-series. The in-series connected battery cells are usually combined into so-called battery packs and then to a battery module which is also referred to as a lithium-ion battery. Each individual battery cell has electrodes which are led out of a housing of the battery cell.

In the use of lithium-ion batteries, for example in the automobile industry, a multitude of problems such as corrosion resistance, stability in accidents and vibration resistance must be solved. An additional problem is the hermetic seal of the battery cells over an extended period of time. The hermetic seal may be compromised by leakage in the area of the electrodes of the battery cell or respectively the electrode feed-through of the battery cell. Such leakages may be caused by temperature changes and alternating mechanical stresses, for example vibrations in the vehicle or aging of the synthetic material. A short-circuit or temperature changes in the battery or respectively battery cell can lead to a reduced life span of the battery or the battery cell.

In order to ensure better stability in accidents, a housing for a lithium-ion battery is suggested, for example in DE 101 05 877 A1, whereby the housing includes a metal jacket which is open on both sides and which is being sealed. The power connection, or respectively the electrodes, are insulated by plastic. A disadvantage of the plastic insulations is the limited temperature resistance, the limited mechanical stability, aging and the uncertain hermetic seal over the service life. The feed-throughs on the lithium-ion batteries according to the current state of the art are therefore not integrated hermetically sealed into the cover part of the lithium-ion battery. Moreover, the electrodes are crimped and laser welded connecting components with additional insulators in the interior of the battery.

An additional problem with the lithium-ion batteries according to the current state of the art is that the battery cells occupy a large space and because of the high currents due to resistance losses, heat and temperature changes occur quickly.

An alkaline battery has become known from DE 27 33 948 A1 wherein an insulator, for example glass or ceramic, is joined directly by means of a fusion seal with a metal component.

One of the metal parts is connected electrically with an anode of the alkaline battery and the other is connected electrically with a cathode of the alkaline battery. The metals used in DE 27 33, 948 A1 are iron or steel. Light metals like aluminum are not described in DE 27 33 948 A1. Also, the sealing temperature of the glass or ceramic material is not cited in DE 27 33 948 A1. The alkaline battery described in DE 27 33 948 A1 is a battery with an alkaline electrolyte which, according to DE 27 33 948 A1, contains sodium hydroxide or potassium hydroxide. Lithium-ion batteries are not mentioned in DE 27 33 948 A1.

A method to produce asymmetrical organic carboxylic acid esters and to produce anhydrous organic electrolytes for alkali-ion batteries has become known from DE 698 04 378 T2, or respectively EP 0885 874 B1. Electrolytes for rechargeable lithium-ion cells are also described in DE 698 04 378 T2, or respectively EP 0 885 874 B1.

Materials for the cell pedestal which receives the through-connection are not described; only materials for the connecting pin which may consist of titanium, aluminum, a nickel alloy or stainless steel.

An RF-feed through (Radio-Frequency feed-through) with improved electrical efficiency is described in DE 699 23 805 T2, or respectively EP 0 954 045 B1. The feed-throughs known from DE 699 23 805 T2, or respectively EP 0 954 045 B1, are not glass-metal feed-throughs. Glass-metal feed-throughs which are provided immediately inside, for example the metal wall of a packing, are described in EP 0 954 045 B1 as being disadvantageous since RF-feed throughs of this type, due to embrittlement of the glass, are not durable.

DE 690 230 71 T2, or respectively EP 0 412 655 B1, describes a glass-metal feed-through for batteries or other electro-chemical cells, whereby glasses having a $SiO_2$ content of approximately 45 weight-% are being used and metals, in particular alloys, are being used which contain molybdenum and/or chromium and/or nickel. The use of light metals is also insufficiently addressed in DE 690 230 71 T2, as are sealing temperatures or bonding temperatures for the used glasses. According to DE 690 230 71 T2, or respectively EP 0 412 655 B1, the materials used for the pin shaped conductor are alloys which contain molybdenum, niobium or tantalum.

A glass-metal feed-through for lithium-ion batteries has become known from U.S. Pat. No. 7,687,200. According to U.S. Pat. No. 7,687,200 the housing was produced from high-grade steel and the pin-shaped conductor from platinum/iridium. The glass materials cited in U.S. Pat. No. 7,687,200 are glasses TA23 and CABAL-12. According to U.S. Pat. No. 5,015,530, these are $CaO-MgO-Al_2O_3-B_2O_3$ systems having sealing temperatures of 1025° C. or 800° C. Moreover, glass compositions for glass-metal feed-throughs for lithium batteries have become known from U.S. Pat. No. 5,015,530 which contain $CaO$, $Al_2O_3$, $B_2O_3$, $SrO$ and $BaO$ whose sealing temperatures are in the range of 650° C.-750° C. and which are therefore too high for use with light metals.

A feed-through has become known from U.S. Pat. No. 4,841,101 wherein an essentially pin-shaped conductor is sealed into a metal ring with a glass material. The metal ring is then inserted into an opening or bore in a housing and is joined material to material through welding, for example through interlocking of a welding ring. The metal ring consists of a metal which has essentially the same or similar thermal coefficient of expansion as the glass material in order to compensate for the high thermal coefficient of expansion of the aluminum of the battery housing. In the design variation described in U.S. Pat. No. 4,841,101 the length of the metal ring is always shorter than the bore or opening in the housing. No references are made in U.S. Pat. No. 4,841,101 to the glass compositions, neither is a special application described for the feed-through, for example for batteries, in particular lithium-ion accumulators.

What is needed in the art is a feed-through which avoids the problems of the current state of the art.

SUMMARY OF THE INVENTION

The present invention provides a feed-through, a conductor, for example an essentially pin-shaped conductor, embedded in a glass or glass ceramic material, which is guided through an opening in a part of a housing, such as a housing for a battery cell, for example made of a light metal having a low melting temperature point, such as aluminum, an aluminum alloy, magnesium, a magnesium alloy, titanium, a titanium alloy or of a metal, such as steel, high-grade steel, for example stainless steel or AlSiC.

A battery according to the present invention is to be understood to be a disposable battery which is disposed of and/or recycled after its discharge, as well as an accumulator.

Accumulators, for example lithium-ion batteries, are intended for various applications, for example for portable electronic equipment, cell phones, power tools and electric vehicles. The batteries can replace traditional energy sources, for example lead-acid batteries, nickel-cadmium batteries or nickel-metal hydride batteries.

The present invention more specifically provides a feed-through including at least one conductor, in particular an essentially pin-shaped conductor and a base body, such as an essentially ring-shaped base body. In one embodiment of the feed-through, through the housing component with an additional base body in which the conductor, in particular into which the pin-shaped conductive material is sealed, it is possible to pre-manufacture the feed-through. In other words it is possible to seal the pin material into the base body and subsequently install it into the housing component, in particular into a battery cell. The base body can then be optimized for the respective manufacturing technology, shape of the feed-through and shape of the housing. Substantially smaller heating devices can then be used due to pre-manufacturing than when sealing directly into the housing part, since the entire housing component does not need to be heated, for example in an oven, but instead only the base body with it's substantially smaller dimensions. An embodiment of a feed-through of this type where pre-manufacturing of the feed-through, which includes a base body and a conductor, in particular an essentially pin-shaped conductor is possible, moreover makes possible a cost effective integration of the feed-through into the opening of the housing component, for example in a single step process, for example by utilizing strain-hardening options of the housing component. Effectively this means that that the opening is first worked into the housing component, for example into the cover, for example by means of stamping. The housing is strain-hardened since it is not heated. In contrast hereto, the base body is soft, since during sealing of the pin-shaped conductor with a glass or glass ceramic material it is heated. In this way, it is possible to produce a structurally stable battery cell housing, in particular in the area of the feed-through, since in contrast to—for example—direct sealing into a housing part, no loss of the strain-hardening in the housing part, in particular the cover, occurs. An additional advantage is that the material strength of the housing component compared to the base body into which the sealing of the pin-shaped conductor occurs can be selected to be clearly less. For example, the material strength of the housing part can be 1.5 millimeters (mm) or less, whereas the base body, due to reasons of strength, has a thickness of approximately 2.0 mm, for example 3.0 mm or more. The material thickness of the housing, or respectively housing part, is, for example between approximately 1 mm and 3 mm, or between 1.5 mm and 3 mm. The thickness of the base body is between approximately 2 mm and 6 mm, for example between 2.5 mm and 5 mm. The thickness of the base body is hereby always adapted to the material thickness of the housing or the housing part, in particular the battery cover, into which the feed-through is placed. In the case of direct sealing, unnecessarily great material thicknesses would in contrast be required.

Another advantage is that the materials for the base body and housing part can be selected to be different, in particular in regard to the material quality and the selection of the alloy. The feed-through can be connected with the base body in the housing component hermetically sealed by welding, pressing, crimping, and shrinking. When joining the feed-through with the housing component, for example by welding, care is taken to keep the temperature input as low as possible in order to avoid damage to the glass or glass ceramic material. In this application "hermetically sealed" means that the helium-leakage is less than $1 \times 10^{-8}$ bar liters per second (1/sec). In contrast to the current state of the art wherein a synthetic material seal has to be provided for the feed-through in a multistep process, a hermetically sealed connection of the inventive feed-through component with the housing component can be produced in a single, simple process step.

Moreover, the selection of the base body can occur also in consideration of the material of the housing part, both as far as the edge configuration, as well as the material hardness are concerned and also the method of closure of the housing. If the housing of the battery cell consists, for example, of aluminum, then the material for the base body may be selected to be also aluminum.

Moreover it is possible to also introduce other functions in the housing part, in addition to the feed-throughs, for example a safety valve and/or battery filling opening.

According to an embodiment of the present invention, the housing part and/or the base body, for example the essentially ring-shaped base body, includes as its material a metal, in particular a light metal such as titanium, a titanium alloy, magnesium, a magnesium alloy, an aluminum alloy, aluminum, AlSiC, but also steel, stainless steel or high-grade steel. As the titanium alloy, Ti 6246 and/or Ti 6242 may be used. Titanium is a material which is well tolerated by the body, so that it is used for medical applications, for example in prosthetics. Due to its strength, resistance and low weight, its use is also favored in special applications, for example in racing sports, but also in aerospace applications.

Additional materials for the base body and/or the housing components are also high-alloyed tool steels which are intended for a later heat treatment. Suitable for use as high-grade steels are, for example, X12CrMoS17, X5CrNi1810, XCrNiS189, X2CrNi1911, X12CrNi177, X5CrNiMo17-12-2, X6CrNiMoTi17-12-2, X6CrNiTi1810 and X15CrNiSi25-20, X10CrNi1808, X2CrNiMo17-12-2, X6CrNiMoTi17-12-2. In order to be able to provide an especially effective weldability during laser welding as well as during resistance welding, high-grade steels, in particular Cr—Ni-steels having material grade numbers (WNr.) according to Euro-Norm (EN) 1.4301, 1.4302, 1.4303, 1.4304, 1.4305, 1.4306, 1.4307 are used as materials for the base body and/or the housing part, in particular the battery cell housing. St35, St37 or St38 can be used as standard steel.

Copper (Cu) or a copper alloy may be used for the pin-shaped conductor, if the pin-shaped conductor is to be connected to a cathode of the electrochemical cell or battery, and aluminum (Al) or an aluminum alloy, if the conductor, in particular the pin-shaped conductor, is to be connected to an anode. Other materials for the pin-shaped conductor can be magnesium, a magnesium alloy, a copper alloy, CuSiC, AlSiC, NiFe, a copper core, that is a NiFe jacket with an interior copper part, silver, a silver alloy, gold, a gold alloy, as well as a cobalt-iron alloy.

As aluminum, or respectively an aluminum alloy, in particular for the conductor, the following can be used:
EN AW-1050 A;
EN AW-1350;
EN AW-2014;
EN AW-3003;
EN AW-4032;
EN AW-5019;
EN AW-5056;
EN AW-5083;
EN AW-5556A;
EN AW-6060; or
EN AW-6061.

As copper, in particular for the conductor, the following can be used:
Cu-PHC 2.0070;
Cu-OF 2.0070;
Cu-ETP 2.0065;
Cu-HCP 2.0070; or
Cu-DHP 2.0090.

In the current application metals which have a specific weight of less than 5.0 kilograms per cubic decimeter (kg/dm$^3$) are understood to be light metals. The specific weight of the light metals is, for example, in the range of between approximately 1.0 kg/dm$^3$ and 3.0 kg/dm$^3$.

If the light metals are additionally used as materials for the conductors, for example for the pin-shaped conductor or the electrode connecting component, then the light metals further distinguish themselves through a specific electric conductivity in the range of between $5 \cdot 10^6$ Siemens per meter (S/m) to $50 \times 10^6$ S/m. When used in compression seal feed-throughs the coefficient of expansion α of the light metal for the range of 20° C. to 300° C. is moreover in the range of $18 \times 10^{-6}$/K to $30 \times 10^{-6}$/K (Kelvin).

Light metals generally have melting temperatures in the range of between approximately 350° C. and 800° C.

The base body is, for example, in the embodiment of a ring-shaped base body, such as in a circular shape, but also oval. The oval shape is utilized, for example, when the housing part, in particular the cover part of the battery cell into whose opening(s) the feed-through is integrated, has a narrow longitudinal shape and the glass or respectively glass ceramic material with which the pin-shaped conductor is guided through the housing part into the opening is integrated fully between the base body and the pin-shaped conductor. With a configuration of this type, the feed-through including the pin-shaped conductor and an essentially ring-shaped base body, can be pre-manufactured.

For this embodiment of the feed-through according to the present invention, glass or glass ceramic materials may be used which have a sealing temperature which is lower than the melting temperature of the base body and/or the essentially pin-shaped conductor. Such exemplary glass or glass ceramic compositions having low sealing temperatures, include the following components:
$P_2O_5$ 35-50 mol-%, for example 39-48 mol-%;
$Al_2O_3$ 0-14 mol-%, for example 2-12 mol-%;
$B_2O_3$ 2-10 mol-%, for example 4-8 mol-%;
$Na_2O$ 0-30 mol-%, for example 0-20 mol-%;
$M_2O$ 0-20 mol-%, for example 12-20 mol-%, whereby M is K, Cs or Rb;
PbO 0-10 mol-%, for example 0-9 mol-%;
$Li_2O$ 0-45 mol-%, for example 0-40 mol-%, or 17-40 mol-%;
BaO 0-20 mol-%, for example 0-20 mol-%, or 5-20 mol-%; and
$Bi_2O_3$ 0-10 mol-%, for example 1-5 mol-%, or 2-5 mol-%.

A further exemplary is the composition including the following components in mol-%:
$P_2O_5$ 38-50 mol-%, for example 39-48 mol-%;
$Al_2O_3$ 3-14 mol-%, for example 2-12 mol-%;
$B_2O_3$ 4-10 mol-%, for example 4-8 mol-%;
$Na_2O$ 10-30 mol-%, for example 0-20 mol-%;
$K_2O$ 10-20 mol-%, for example 12-19 mol-%; and
PbO 0-10 mol-%, for example 0-9 mol-%.

The previously listed glass compositions distinguish themselves not only through a low sealing temperature and a low Tg, but also in that they have sufficient resistance to battery-electrolytes and in this respect ensure the required long-term durability.

The glass materials specified as exemplary are stable phosphate glasses which, as known, alkali-phosphate glasses have clearly a low overall alkali content.

Because of the generally high crystallization-stability of the phosphate glasses it is ensured that the sealing of the glasses is generally not hampered even at temperatures of <600° C. This allows for most of the listed glass compositions to be used as solder glass since sealing of the glass compositions is generally not hampered even at temperatures of <600° C.

The previously mentioned glass compositions contain lithium, which is integrated in the glass structure. The glass compositions are hereby especially suited for lithium-ion storage devices which include electrolytes based on lithium, for example a 1 molar (M) $LiPF_6$-solution, including a 1:1 mixture of ethylene-carbonate and dimethyl-carbonate.

Further exemplary compositions are low sodium or respectively sodium-free glass compositions, since the diffusion of the alkali-ions occurs in Na+>K+>Cs+ sequence and since, therefore, low sodium glasses or respectively sodium-free glasses are especially resistant to electrolytes, especially those which are used in lithium-ion storage devices.

Moreover, these types of glass compositions have a thermal expansion α in a temperature range of between approximately 20° C. to 300° C.>$14 \times 10^{-6}$/K, especially between $15 \times 10^{-6}$/K and $25 \times 10^{-6}$/K. An additional advantage of the glass composition of the present invention is that sealing of the glass with the surrounding light metal or respectively the metal of the conductor, in particular in the embodiment of a metal pin, is possible also in a gaseous atmosphere which is not an inert gas atmosphere. In contrast to the previously used method, a vacuum is also no longer necessary for Al-sealing. This type of sealing can rather occur under atmospheric conditions. For both types of sealing nitrogen ($N_2$) or argon (Ar) can be used as inert gas. As a pre-treatment for sealing, the metal is cleaned and/or etched, and if necessary is subjected to targeted oxidizing or coating. During the process, temperatures of between 300° C. and 600° C. are used at heating rates of 0.1 to 30 Kelvin per minute (K/min.) and dwell times of 1 to 60 minutes.

The sealing temperature may, for example, be determined through the hemispherical temperature as described in R. Görke, K. J. Leers: Keram. Z. 48 (1996) 300-305, or according to DIN 51730, ISO 540 or CEN/TS 15404 and 15370-1 whose disclosure content is incorporated in its entirety into the current patent application. The measurement of the hemispherical temperature is described in detail in DE 10 2009 011 182 A1 whose disclosure content is incorporated in its entirety into the current patent application. According to DE 10 2009 011 182A1, the hemispherical temperature can be determined in a microscopic process by using a heating stage microscope. It identifies the temperature at which an originally cylindrical test body melted into a hemispherical mass. A viscosity of approximately log $\eta$=4.6 deciPascals (dPas) can be allocated to the hemispherical temperature, as can be learned from appropriate technical literature. If a crystallization-free glass, for example in the form of a glass powder, is melted and then cooled so that it solidifies, it can then normally be melted down again at the same melting temperature. For a bonded connection with a crystallization-free glass this means that the operating temperature to which the bonded connection is continuously subjected may not be higher than the sealing temperature. Glass compositions as utilized in the current application are generally often produced from a glass powder which is melted down and which, under the influence of heat provides the bonded connection with the components which are to be joined. Generally, the sealing temperature or melting temperature is consistent with the level of the so-called hemispherical temperature of the glass. Glasses having low sealing temperatures, or respectively melting temperatures, are also referred to as solder glass. Instead of sealing or melting temperature, one speaks of solder temperature or soldering temperature in this instance. The sealing temperature, or respectively the solder temperature, may deviate from the hemispherical temperature by +20K.

It is further feasible if the housing part of the battery housing or respectively the battery cell housing has an outside and an inside, and the base body of the feed-through is connected with the inside or the outside of the housing part, for example by flanging, welding, pressing, soldering or shrinking.

The base body may have a protrusion, so that a part of the base body engages into the opening of the housing component, and that another part of the base body protrudes over the opening and rests on the inside or the outside of the housing part or respectively can be connected there with the housing part.

In a further embodiment of the present invention, the pin-shaped conductor also includes a head part or respectively a connecting component. The head part can have an extension protruding over the head part. The extension can serve to center electrodes or electrode connecting parts. In the embodiment featuring a head part, electrode connecting parts or respectively the battery electrodes can be connected to the head part which extends into the interior of the battery cell housing.

The extension may have another outside contour different than the pin-shaped conductor. It is therefore possible that the pin-shaped conductor has an oval outside contour and the extension in contrast a ring-shaped outside contour. Also, the dimensions do not necessarily need to be the same.

In addition to the feed-through, the present invention also provides a housing, for example for an electrical storage device, in particular a battery cell. The housing includes at least one housing part having at least one opening and is characterized in that the opening of the housing part accommodates an inventive feed-through with at least one pin-shaped conductor which is sealed into a base body.

The battery cell which is provided for the housing is, for example a battery cell for a lithium-ion battery.

The present invention moreover provides a method to produce a feed-through with at least one essentially pin-shaped conductor, whereby the method includes the following steps:
  a conductor, such as an essentially pin-shaped conductor and a base body are provided; and
  the conductor, for example the essentially pin-shaped conductor, is sealed into a base body embedded in a glass or glass ceramic material, resulting in the feed-through for a part of a housing, in particular a battery cell housing.

In addition, a method is shown for the provision of a feed-through into a base body into a housing part, which distinguishes itself in that the feed-through is connected with the base body and the therein sealed conductor, for example the pin-shaped conductor by welding, for example laser welding, electron beam welding, ultrasonic welding, resistance welding as well as alternatively by soldering, shrinking, pressing or flanging.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1A:
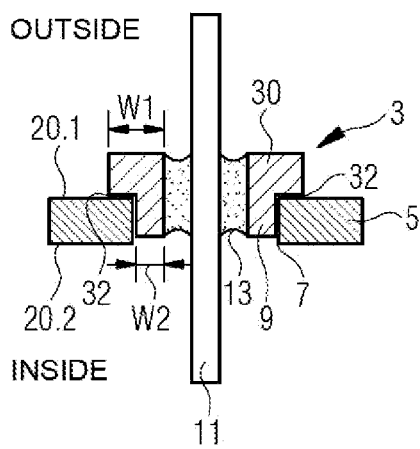
FIGS. 1a-1b illustrate a first embodiment of an inventive feed-through with a metal pin and a base body in a housing component, whereby the base body is in the embodiment of a flange ring.

Referring now to the drawings, and more particularly to FIG. 1, there is shown an inventive feed-through 3 through a housing component 5 of a housing, for example a housing for an accumulator, such as a battery cell for a lithium-ion battery, according to, for example FIGS. 10a-12c.

Even though in the following, examples for pin-shaped conductors without a head part are described, these examples may also apply to pin-shaped conductors with a head part, without this being explicitly expressed.

Housing component 5 includes an opening 7 which is placed into the housing component. The inventive feed-through, including the base body, in particular the essentially ring-shaped base body 9 which accommodates the conductor, in particular the essentially pin-shaped conductor 11 is inserted into opening 7. Pin-shaped conductor 11 is sealed into essentially ring-shaped base body 9. In order to provide a hermetic feed-through of pin-shaped conductor 11 through base body 9 and thereby opening 7, essentially pin-shaped conductor 11 is sealed into a glass plug consisting of a glass- or glass ceramic material. In other words, base body 9 and essentially pin-shaped conductor 11 are sealed with glass 13.

If materials with different coefficients of expansion a are used, for example for base body 9, pin-shaped conductor 11 and glass material 13, then a so-called compression seal feed-through can be provided. The advantage of a compression seal feed-through consists in that, that even under a greater load upon the glass plug 13, for example in the event of compressive stress, expulsion of the glass plug 13 with metal pin 11 from base body 9 is avoided. The sealing temperature of the glass- or glass ceramic material is, for example approximately 20K to 100K below the melting temperature of the material of base body 9 and/or of pin-shaped conductor 11. If base body 9 is constructed of a metal having a low melting point, in particular a light metal, for example aluminum, an aluminum alloy, magnesium, a magnesium alloy or AlSiC, titanium, a titanium alloy, but also steel, stainless steel or high-grade steel, then a glass material through which the conductor is guided and which includes the following components in Mole percent (mol-%) may be used:

$P_2O_5$ 35-50 mol-%, for example 39-48 mol-%;
$Al_2O_3$ 0-14 mol-%, for example 2-12 mol-%;
$B_2O_3$ 2-10 mol-%, for example 4-8 mol-%;
$Na_2O$ 0-30 mol-%, for example 0-20 mol-%;
$M_2O$ 0-20 mol-%, for example 12-20 mol-%, whereby M is K, Cs, or Rb;
PbO 0-10 mol-%, for example 0-9 mol-%;
$Li_2O$ 0-45 mol-%, for example 0-40 mol-%, or 17-40 mol-%;
BaO 0-20 mol-%, for example 0-20 mol-%, or 5-20 mol-%; and
$Bi_2O_3$ 0-10 mol-%, for example 1-5 mol-%, or 2-5 mol-%.

In a further embodiment, the glass composition according to the present invention includes the following components in mol-%:

$P_2O_5$ 38-50 mol-%, for example 39-48 mol-%;
$Al_2O_3$ 3-14 mol-%, for example 4-12 mol-%;
$B_2O_3$ 4-10 mol-%, for example 4-8 mol-%;
$Na_2O$ 10-30 mol-%, for example 14-20 mol-%;
$K_2O$ 10-20 mol-%, for example 12-19 mol-%; and
PbO 0-10 mol-%, for example 0-9 mol-%.

Below, eight examples are shown in Table 1 for the aforementioned glass compositions.

TABLE 1

| | Examples: | | | | | | | |
|---|---|---|---|---|---|---|---|---|
| Mol-% | AB1 | AB2 | AB3 | AB4 | AB5 | AB6 | AB7 | AB8 |
| $P_2O_5$ | 47.6 | 43.3 | 43.3 | 43.3 | 37.1 | 40.0 | 42.0 | 46.5 |
| $B_2O_3$ | 7.6 | 4.8 | 4.7 | 4.8 | 4.9 | 6.0 | 6.0 | 7.6 |
| $Al_2O_3$ | 4.2 | 8.6 | 8.7 | 2.0 | 2 | 12.0 | 12.0 | 4.2 |
| $Na_2O$ | 28.3 | 17.3 | | | | 15.0 | 16.0 | 28.3 |
| $K_2O$ | 12.4 | 17.3 | 17.3 | | | 18.0 | 19.0 | 12.4 |
| PbO | | | | | | 9.0 | | |
| BaO | | 8.7 | 8.7 | 15.4 | 14 | | | |
| $Li_2O$ | | | 17.3 | 34.6 | 42.1 | | | |
| $Bi_2O_3$ | | | | | | | 5 | 1 |
| Hemispherical Temperature (° C.) | 513 | 554 | 564 | 540 | 625 | | 553 | 502 |
| α (20-300° C.) ($10^{-6}$/K) | 19 | 16.5 | 14.9 | 13.7 | 14.8 | 16.7 | 16.0 | 19.8 |
| Tg (° C.) | 325 | 375 | 354 | 369 | 359 | 392 | 425 | 347 |
| Density in grams per cubic centimeter [g/cm$^3$] | 2.56 | | | | | 3 | 3.02 | 2.63 |
| Leaching In Mass % (Ma-%) | 18.7 | 14.11 | 7.66 | 12.63 | 1.47 | 3.7 | 29.01 | 8.43 |

TABLE 1-continued

| Mol-% | Examples: | | | | | | | |
|---|---|---|---|---|---|---|---|---|
| | AB1 | AB2 | AB3 | AB4 | AB5 | AB6 | AB7 | AB8 |
| Weight Loss (%) after 70 h in 70° C.-water | 10.7 | 0.37 | 0.1 | 0.13 | 0.13 | n.b. | 0.006/0.001 | 0.45/0.66 |

The aforementioned special glass composition distinguishes itself in that the glass materials have very high thermal expansions in the range of >15×10$^{-6}$/K, for example in the range 15×10$^{-6}$/K to 25×10$^{-6}$/K for temperatures between 20° C. and 300° C., and therefore in the range of the thermal expansion of light metals such as aluminum, but also of similar metals for essentially pin-shaped conductor 11 which are guided through glass material 13, namely copper. At room temperature, aluminum has a thermal expansion of α=23×10$^{-6}$/K, copper of 16.5×10$^{-6}$/K. In order to avoid that during the sealing process the light metal of the base body and possibly also the metal pin melts or deforms, the melting temperature of the glass material is below the melting temperature of the material of the base body and/or the conductor. The sealing temperature of the listed glass composition is then in the range of 250° C. to 650° C. Sealing of essentially pin-shaped conductor 11 into base body 9 prior to placing feed-through 3 into opening 7 is achieved in that the glass together with the conductor 11, in particular pin-shaped conductor 11 is heated to the sealing temperature of the glass, so that the glass material softens and surrounds the conductor, for example the pin-shaped conductor 11 in the opening and fits against base body 9. If, for example as described above, aluminum is used for base body 9 as light metal having a melting point (T$_{melt}$)=660.32° C., then the sealing temperature of the glass material is, as described above may be in the range of 350° C. to 640° C. The material of pin-shaped conductor 11 is, for example, identical to the material of base body 9 which has the advantage that the coefficient of expansion for base body 9 and for metal pin 11 is identical. Pin shaped conductor 11 may include or be formed by aluminum, an aluminum alloy, AlSiC, copper, a copper alloy, CuSiC- or NiFe-alloys, a copper core, that is a NiFe jacket with an interior copper part, silver, a silver alloy, gold or a gold alloy. If the coefficient of expansion a in the range of 20° C. to 300° C. of the glass or glass ceramic material is not completely adapted to the material of base body 9 then a compression seal feed-through is provided. Otherwise it is a so-called adapted feed-through.

Exemplary materials for base body 9 are light metals, such as aluminum (Al), AlSiC, an aluminum alloy, magnesium, a magnesium alloy, titanium, a titanium alloy. Alternative materials for base body 9 are metals such as steel, stainless steel, high-grade steel or tool steel.

Sealing temperature of the glass or glass ceramic is to be understood to be the temperature of the glass or the glass ceramic whereby the glass material softens and then fits closely against the metal with which is to be sealed so that a bonded joint connection is obtained between the glass or the glass ceramic and the metal.

The sealing temperature may, for example, be determined through the hemispherical temperature as described in R. Görke, K. J. Leers: Keram. Z. 48 (1996) 300-305, or according to DIN 51730, ISO 540 or CEN/TS 15404 and 15370-1 whose disclosure content is incorporated in its entirety into the current patent application. The measurement of the hemispherical temperature is described in detail in DE 10 2009 011 182 A1 whose disclosure content is incorporated in its entirety into the current patent application.

The solder glasses having become known from DE 10 2009 011 182 A1 pertain to high temperature applications, for example fuel cells.

The previously cited phosphate glass compositions have a lithium-share of up to 45 mol-%, for example 35 mol-%. Surprisingly, these glass composition are crystallization-stable, meaning they do no display detrimental crystallization during a downstream sintering process, in particular any substantial crystallization for less than 35 mol-%.

The previously mentioned glass compositions contain lithium (Li) which is integrated in the glass structure. The glass compositions are hereby especially suited for lithium-ion storage devices which include electrolytes based on lithium, for example a 1 M LiPF$_6$-solution, including a 1:1 mixture of ethylene-carbonate and dimethyl-carbonate.

Low sodium or respectively sodium-free glass compositions may also be utilized, since the diffusion of the alkali-ions occurs in Na+>K+>Cs+ sequence and since therefore low sodium or respectively sodium-free glasses are especially resistant to electrolytes, especially those which are used in lithium-ion storage devices.

The previously cited glass compositions have a thermal expansion α (20° C. to 300° C.)>14×10$^{-6}$/K, for example between 15×10$^{-6}$/K and 25×10$^{-6}$/K. An additional advantage of the glass composition is that sealing of the glass with the surrounding light metal or respectively the metal of the conductor, for example in the embodiment of a metal pin, is possible also in a gaseous atmosphere which is not an inert gas atmosphere. In contrast to the previously used method, a vacuum is also no longer necessary for aluminum-sealing. This type of sealing can rather occur under atmospheric conditions. For both types of sealing nitrogen (N$_2$) or argon (Ar) can be used as inert gas. As a pre-treatment for sealing, the metal is cleaned and/or etched, and if necessary is subjected to targeted oxidizing or coating. During the process temperatures of between 300 and 600° C. are used at heating rates of 0.1 to 30 Kelvin per minute (K/min) and dwell times of 1 to 60 minutes.

Figure 1B:
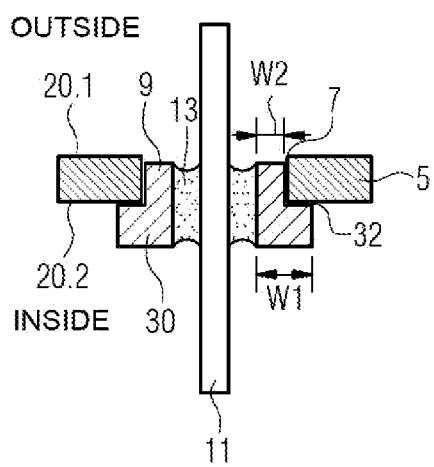

Furthermore, housing part 5 of the housing of the battery or battery cell, in this case the battery cover is illustrated in FIGS. 1a and 1b and is equipped with the openings for the feed-through of the electrodes. The battery cover or respectively the housing component is also, for example, produced from aluminum. Materials also conceivable for the battery cover or the housing part are however also: aluminum alloys, magnesium as well as magnesium alloys, AlSiC, titanium, titanium alloys, but also steel, stainless steel or high-grade steel. The housing part has outside 20.1 and inside 20.2. The outside 20.1 is characterized in that it extends outward from the battery cell; the inside in that it extends—for example in the case of a lithium-ion accumulator—toward the electrolyte of the battery cell. The entire housing with battery cell and feed-throughs is illustrated in FIGS. 10a-12c.

In the case of lithium-ion batteries, typically a non-aqueous electrolyte, typically consisting of a carbonate, such as a carbonate mixture, for example a mixture of ethylene-carbonate and dimethyl-carbonate is used, whereby the aggressive non-aqueous battery electrodes include a conducting salt, for example conducting salt $LiPF_6$ in the form of a 1-Molar solution.

According to the first embodiment, base body 9 features protrusion 30, whereby wall thickness $W_1$ of the ring-shaped base body in the example according to FIG. 1a is greater on the outside of housing part 5 than thickness $W_1$ of ring-shaped base body 9 in the region of the inside of the housing part 5, resulting in contact 32 of base body 9 on the outside of the ring-shaped body 9. Ring body 9 can be connected with housing part 5 in the area of contact 32 by laser welding, electron beam welding, soldering, shrinking into opening 7, as well as pressing into opening 7 and flanging.

FIG. 1b is an analog configuration compared to the embodiment of FIG. 1a of a feed-through, wherein identical reference numbers have been used for identical components. However, in this case width $W_1$ in the region of inside 20.2 is greater than width $W_2$ in the region of outside 20.1.

Other than that the arrangement, FIG. 1b is identical to FIG. 1a. As in FIG. 1a the connection between housing part 5, in this case the battery cover and base body 9 can occur, for example as previously described through laser welding, electron beam welding, soldering, shrinking or pressing into opening 7.

Figure 2A:
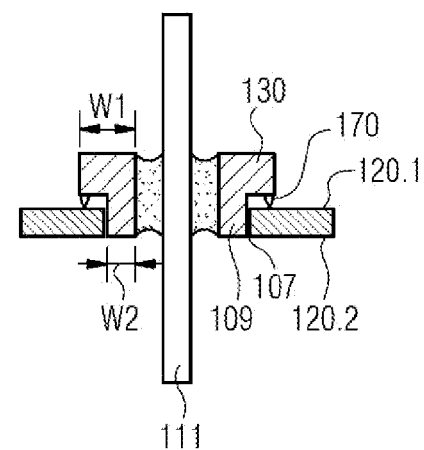
FIGS. 2a-2b illustrate a second embodiment of an inventive feed-through with a base body which is in the embodiment of a welding ring.
Figure 2B:
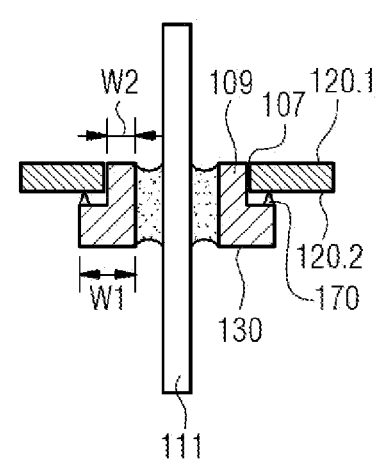

Whereas base body 9 according to FIGS. 1a and 1b is essentially a flange ring, ring-shaped base body 109 according to the arrangement shown in FIGS. 2a and 2b is a ring-shaped base body 109 with a welding ring 170. Identical components as in FIGS. 1a and 1b are identified with reference numbers increased by 100. The arrangement according to FIGS. 2a to 2b is substantially identical to the arrangements according to FIGS. 1a to 1b. The ring-shaped base body 109 with a welding ring 170 permits joining of base body 109 with the housing part 105 by alternative connection methods. Connecting ring-shaped base body 109 of feed-through 103 with the housing part 105 in the region of welding ring 170 can occur through resistance welding or resistance soldering.

Figure 3:
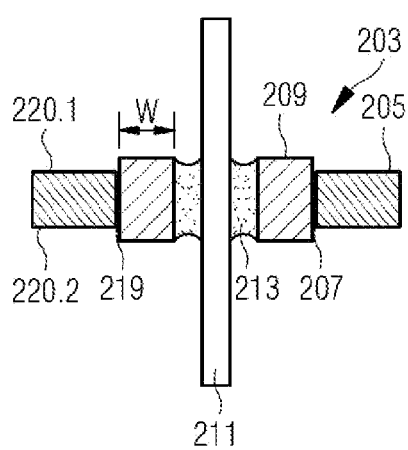
FIG. 3 illustrates a third embodiment of an inventive feed-through, whereby the base body is connected with the housing component in the area of the opening by laser welding, soldering, shrinking or electro-welding.

FIG. 3 illustrates an additional arrangement of the present invention. Identical components as in FIGS. 1a to 1b and 2a to 2b are identified with reference numbers increased by 200 compared to FIGS. 1a and 1b or respectively 100 compared to FIGS. 2a to 2b. In contrast to the arrangements according to FIGS. 1a to 1b and 2a to 2b, base body 209 has no different widths W1 and W2, so that a contact 32 is created. Width W of the ring-shaped base body is uniform over the entire height. Ring-shaped base body 209 having the same width over the entire height is placed into opening 207. A connection between housing part 205 and feed-through 203, including ring-shaped base body 209 as well as glass material 213 and the essentially pin-shaped conductor 211 is achieved by insertion into opening 207 and subsequent joining in the region of side walls 219 of opening 207. The connection can be accomplished through laser welding, soldering, shrinking, pressing into the opening or electron beam welding.

Figure 4A:
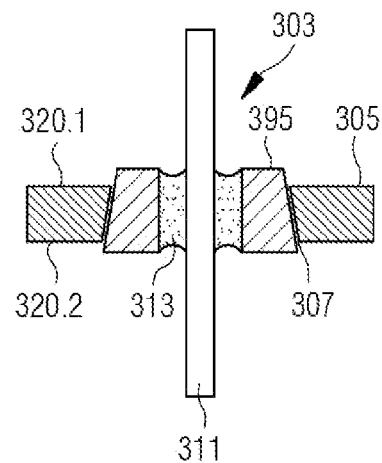
FIGS. 4a-4c illustrate a fourth embodiment of the inventive feed-through with a conical ring as the base body which is to be placed into an opening in the housing component.
Figure 4B:
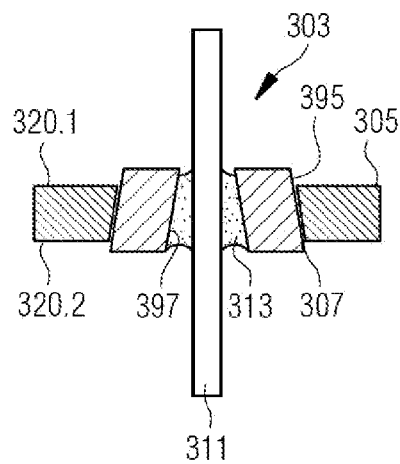
Figure 4C:
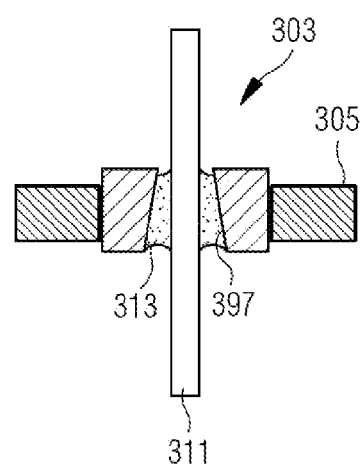

Referring now to FIGS. 4a-4c there are shown alternative arrangements of a feed-through 303 which is placed into opening 307 in housing part 305. This is essentially consistent with the arrangement according to FIG. 3, whereby identical components are identified by reference numbers increased by 100. In contrast to FIG. 3, base body 309 is however in the form of a conical ring which is inserted into a conically progressing opening 307. The connection between the feed-through occurs again between the side walls of conical opening 307 and conical base body 309, for example through welding, soldering, flanging, shrinking. It is however also possible to press the essentially conically progressing annular base body 309 into conical opening 307 in housing part 305. The conical base body can be in the form of the three arrangements illustrated in FIGS. 4a-4c. In FIG. 4a base body 309 is conical on outside 395 toward housing part 305; in FIG. 4b on the outside 395 as well as on inside 397 facing pin-shaped conductor 311 and in FIG. 4c only on inside 397. Due to the conical form of the opening as well as of the base body, a relative movement of the feed-through in the direction of outside 320.1 of housing part 305 is avoided, since the conical bore and the conically shaped base body act as a barb and a relative movement in the direction of outside 320.1 leads to a positive locking fit between base body 309 of feed-through 303 and the side-walls of opening 307.

One advantage of the arrangement according to FIGS. 4a to 4c is that even under increased load on the feed-through 303, for example pressure load, pushing feed-through 303 with metal pin 311 out of feed-through opening 307 is securely avoided. Openings 307 may be introduced into housing part 305 through a simple manufacturing method, for example punching.

Referring now to FIGS. 5a to 5c and FIGS. 7a to 7b, there are illustrated arrangements of the present invention whereby again ring-shaped base body 509 is provided. However, here the pin-shaped conductor 511 is equipped with a head part 580. Sealing in this arrangement according to FIGS. 5a to 5c as well as 6a to 6b and FIGS. 7a to 7b occurs not only between pin-shaped conductor 511, which can be inserted through ring-shaped base body 509 which, as for example illustrated in FIG. 3 can be inserted into the housing part, but in this case the glass material or glass ceramic material 513 is also introduced between base body 509 and head part 580.

The dimensions A1 of head part 580 are hereby greater than dimensions A1 of the essentially pin-shaped conductor 511. With a conductor having an essentially round cross section, the dimensions of the head part are then greater than the diameter of the pin-shaped conductor. This means that the head surface of the head part is greater than the head surface of pin-shaped conductor 511 with which head part 580 is connected. Head part 580 can moreover be configured such that it can be connected with an electrode connecting component. The electrode connecting component is, for example, a component of copper for the cathode or aluminum for the anode. The connection of head part and electrode connecting component (not illustrated) occurs through a mechanically stable, for example non-detachable electrical connection. A mechanically stable, non-detachable electrical connection of this type is provided in that the head part and the electrode connecting part is firmly connected by welding, such as resistance welding, electron beam welding, friction welding, ultrasonic welding, bonding, gluing, soldering, caulking, shrinking, grouting, jamming and crimping. The connection of head part and electrode connecting part occurs after head part 580 and pin-shaped conductor 511 are inserted or sealed into the housing of the battery or battery cell. It would of course also be possible, to connect the feed-through component with the electrode connecting component prior to insertion or respectively sealing into the housing opening.

An arrangement with head part 580 provides a feed-through which, when used in a housing for battery cells requires only a small interior space. The head part of the inventive feed-through component has a very large supporting surface for the connection of the electrode connecting component. Very high stability is herewith achieved in the connection area. In particular, compared to a connection of the electrode connecting components directly to the pin-shaped conductor a substantially greater flexural rigidity is achieved. Another advantage of connecting the electrode connecting components via the head part is in that, as opposed to a direct connection with the pin, constrictions, or considerable changes in the cross sectional area in the conducting path from the battery cell to the feed-through through the housing of the battery cell are avoided. Cross sectional constrictions—especially at high currents of 20 amps (A) to 500 A—lead to high heat dissipation in lithium-ion accumulators as the energy supplier in automobiles, which can cause problems in the battery cells. Such heat losses can be avoided with inventive head part 580.

An extension 582 protrudes over the conductor, in particular the pin-shaped conductor 511, for example over inside 520.2 into the interior of the battery cell, whereby extension 582 of the conductor can aid centering of the previously addressed electrode connecting part. Extension 582 of the pin-shaped conductor is preferably always round regardless of the shape of the conductor which may for example be oval or round. Also, the dimension of the extension and the essentially pin-shaped conductor can be different.

Figure 5C:
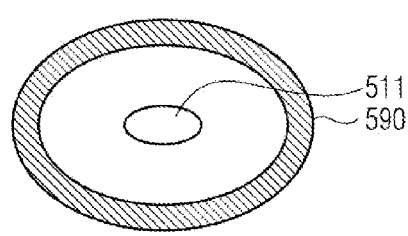
FIGS. 5a-5c illustrate one embodiment of an inventive feed-through with an oval pin-shaped conductor having an oval head part.
Figure 5A:
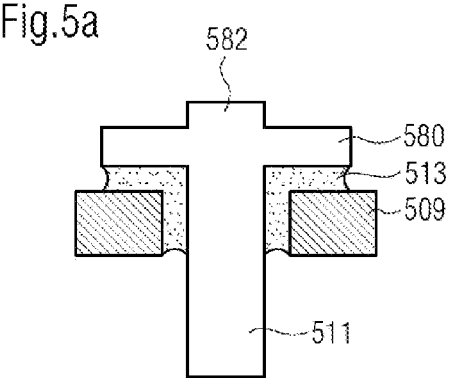
Figure 5B:
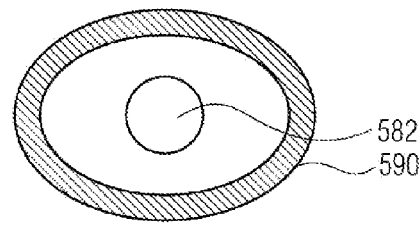

Ring-shaped base body 509 can also assume different forms, for example as shown in FIGS. 5a to 5c an oval outer shape 590, whereby then also the conductor in the area where it is guided through the oval base body—that is in region 511—can be oval; the head part as shown in the top view in FIG. 5b however is round for connection to the electrode connecting components.

Alternatively to an oval configuration of the ring-shaped base body, the pin-shaped conductor and the extension, which is particularly advantageous on narrow battery covers, it is possible to design the pin-shaped conductor as well as the centering extension and the base body ring-shaped. Shapes can obviously also be mixed, that is, oval base body with ring-shaped, pin-shaped conductor without any further description thereof.

Figure 6B:
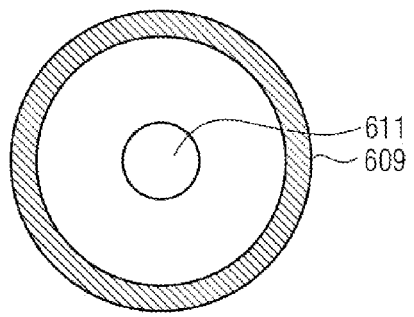
FIGS. 6a-6b illustrate an additional embodiment of the present invention with a circular pin-shaped conductor with a circular head part.
Figure 6A:
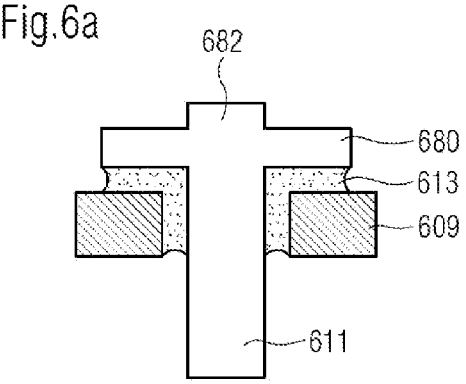

A ring-shaped base body with ring-shaped, pin-shaped conductor is shown in FIGS. 6a to 6b. Identical components as in FIGS. 5a to 5c are identified by reference numbers increased by 100, for example in FIGS. 6a to 6c the pin-shaped conductor is identified with reference number 611, the head part with 680 and the annular base body with 609.

Figure 7A:
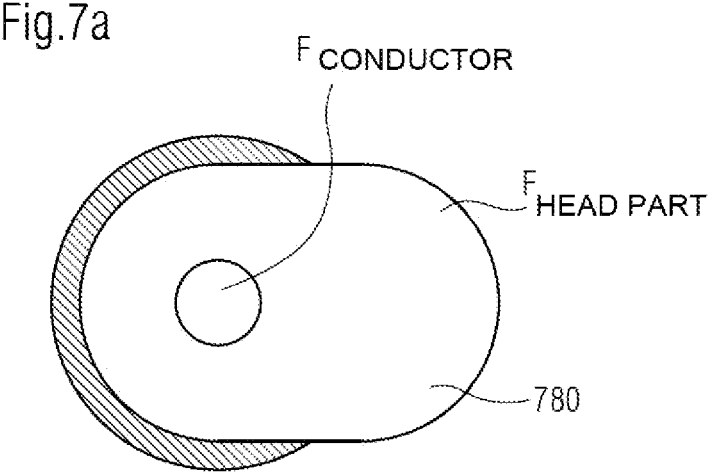
FIGS. 7a-7b illustrate a fourth embodiment of the present invention having a pin-shaped conductor with a head part.
Figure 7B:
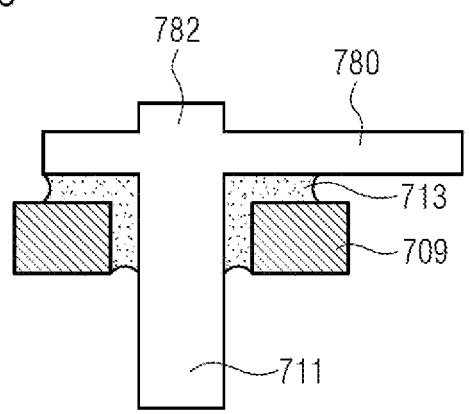

In order to connect other connecting parts or connecting components to the electrodes, it is provided in an arrangement according to FIGS. 7a and 7b to project head surface 780 of head part over the diameter of the opening. Identical components as in FIGS. 5a to 5c are identified with reference numbers increased by 200, for example the pin-shaped conductor is identified with reference number 711 and the annular base body with 709. Due to accessibility from both sides, the projection 782 of head part 780 also allows joining by through-welding, resistance welding or riveting in addition to the previously described connection methods.

In the embodiment according to FIG. 7 it can be clearly seen, especially the inventive characteristic of the feed-through component, that the surface of head part 780 ($F_{HEAD\ PART}$) is larger than the surface of pin-shaped conductor 711 ($F_{CONDUCTOR}$).

Since in the arrangement according to FIGS. 7a and 7b the dimensions and shape of the extension of pin-shaped conductor 711 correspond, the cross sectional surface of the extension illustrated in the top view is consistent with the surface of the pin-shaped conductor.

Shown in FIGS. 8a-9b are embodiments of a feed-through of a pin-shaped conductor through a base body whereby the feed-through into the housing component, in particular the battery cover, is shown with a thermal barrier and a mechanical relief. More specifically, the inventive feed-through illustrated in each of FIGS. 8a and 8b feature a relief device for mechanical relief and shown as thermal barrier.

Figure 8A:
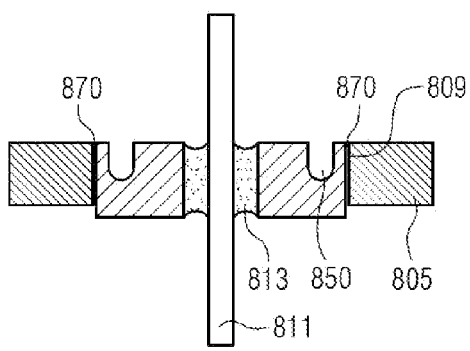
FIGS. 8a-8b illustrate an embodiment of an inventive feed-through with thermal barrier and mechanical relief.
Figure 8B:
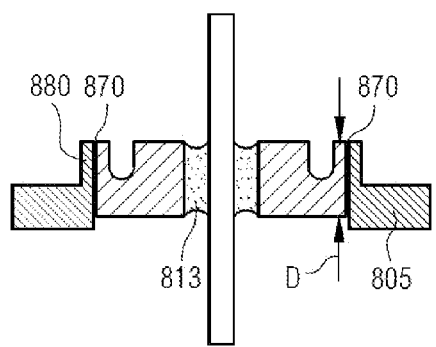

In contrast to the embodiments according to FIGS. 1a-4, base body 809 according to the embodiment shown in FIGS. 8a and 8b includes a circumferential groove 850 as the relief device. An essentially pin-shaped conductor 811 is again sealed with a glass or glass ceramic material 813 into base body 809 which features circumferential groove 850.

Even though not illustrated and implicitly expressed, in an alternative embodiment the conductor can also be configured to include a head part, without the expert having to become inventively active.

Further shown in FIG. 8a is also a housing part 805, essentially a cover for the battery cell. The feed-through, consisting of base body 809 with essentially pin-shaped conductor sealed, is circumferentially connected with hosing part 805 in region 870, for example by welding, in particular laser welding. Circumferential groove 850 on the one hand provides a thermal barrier, on the other it provides the necessary elasticity in order to protect or respectively de-stress the feed-through, in particular in the region of seal 813. The circumferential groove 850 achieves in particular that occurring mechanical and thermal stresses upon the glass or respectively glass ceramic material are reduced. Crack formations in the glass or respectively glass-ceramic material of the feed-through which could lead to leakage can herewith be considerably reduced.

The arrangement according to FIG. 8b again shows a feed-through having a circumferential groove 850 as a relief device in the base body 809. In contrast to the arrangement according to FIG. 8a, housing component 805 in this case is provided with protrusion 880 in the region of the connection between feed-through and housing component 805. Compared to the arrangement according to FIG. 8a this leads to an even better mechanical relief. Base body 809 can moreover be connected with housing part 805 over its entire thickness D, thereby permitting a precise welding process.

Figure 9A:
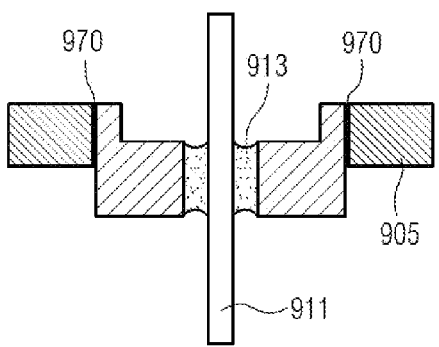
FIGS. 9a-9b illustrate an additional embodiment of an inventive feed-through with a thermal barrier and mechanical relief.
Figure 9B:
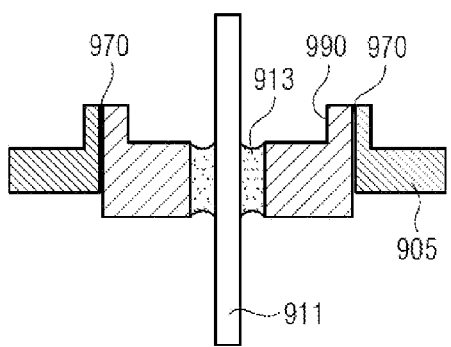

FIGS. 9a and 9b illustrate alternative embodiments to FIGS. 8a and 8b, whereby a relief device as well as a thermal barrier are also provided in FIGS. 9a and 9b. In contrast to the embodiment in accordance with FIG. 8a, the base body 909 in this case is not equipped with a circumferential groove as relief device, but instead with a protrusion 990. Identical components as in FIGS. 8a-8b are identified with reference numbers increased by 100 compared to FIGS. 8a and 8b. Accordingly, pin-shaped conductor is identified with reference 911, and the glass and glass ceramic material with 913. The region of the connection between feed-through and housing component is identified with 970. The advantages described above for FIG. 8a also apply to FIG. 9a and are herewith included.

FIG. 9b illustrates an alternative embodiment to that illustrated in FIG. 9a. In addition to the essentially ring-shaped base body 909, cover part 905 also has a protrusion 980. The advantages described above for FIG. 8b also apply to FIG. 9b and are herewith included.

All arrangements illustrated in FIGS. 8a to 9b which provide a mechanical and thermal relief are possible with a pin-shaped conductor 811 instead of the illustrated arrangement, also with a pin-shaped conductor with head part, as described in detail in FIGS. 5 to 7. The disclosure content of the description relating to FIGS. 5 through 7 is herewith included in its entirety without requiring special reference thereto.

Figure 10A:
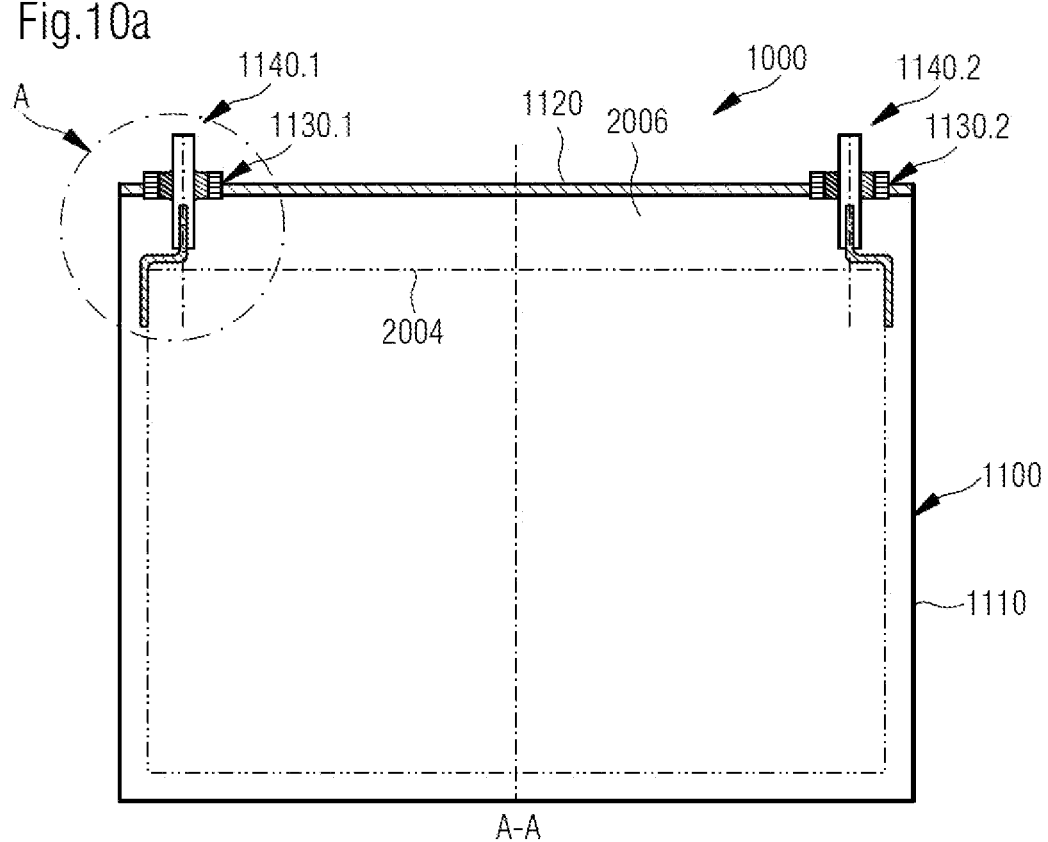
FIGS. 10a-10b illustrate a battery cell with a battery cell housing and a feed-through according to the present invention with feed-through component without head part with electrode connecting component.
Figure 10B:
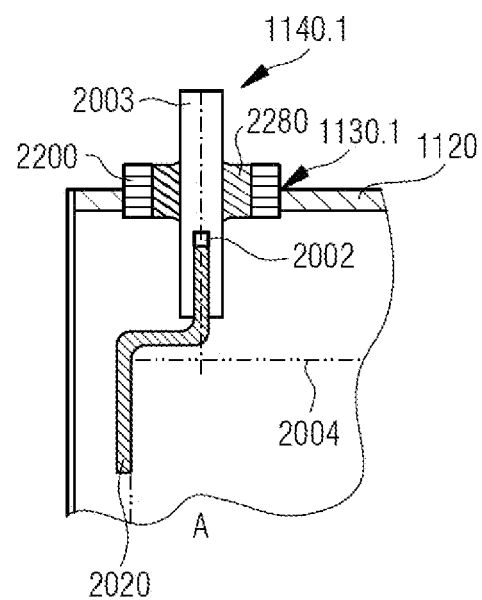
Figure 11A:
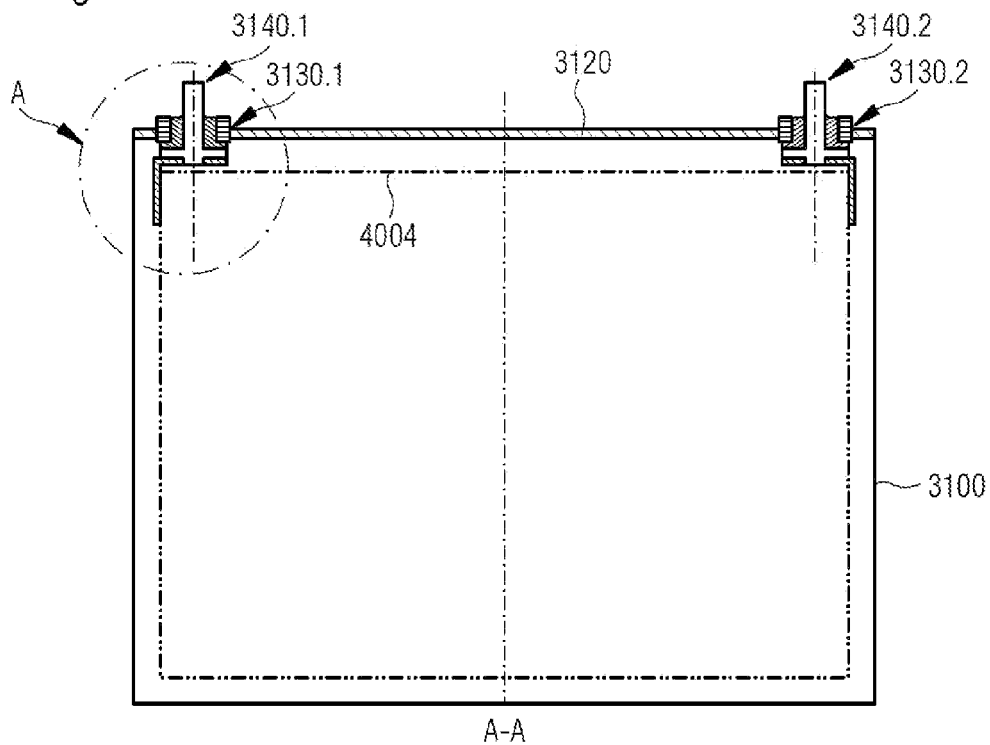
FIGS. 11a-11b illustrate a battery cell with a battery cell housing and a feed-through with feed-through component with a head part according to the present invention, with an electrode connecting component.
Figure 11B:
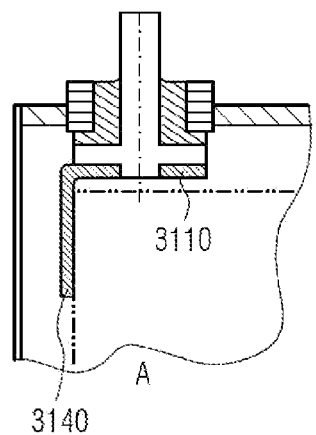

Referring now to FIGS. 10a-11b, there is illustrated complete battery cells for a lithium-ion battery, with inserted feed-throughs according to the present invention. FIGS. 10a-10b illustrate one arrangement of the present invention wherein the pin-shaped conductor is not equipped with a head part, that is, a feed-through according to FIGS. 1a through 4, or respectively 9a through 10b. In contrast thereto, FIGS. 11a to 11b show a battery cell with a housing and feed-throughs located therein, whereby the pin-shaped conductor is equipped with a head part according to the present invention.

Referring now to FIG. 10a, there is shown the principle design of a battery cell 1000. Battery cell 1000 includes a housing 1100 with side walls 1110 and a cover part 1120. Openings 1130.1, 1130.2 are produced in the opening of cover part 1120 of housing 1100, for example by stamping. Feed-throughs 1140.1, 1140.2 are again inserted in both openings 1130.1, 1130.2.

FIG. 10b shows a detailed section of battery cover 1120 with opening 1130.1 and the therein inserted feed-through 1140.1. Feed-through 1140.1 comprises a pin-shaped conductor 2003, as well as a base body 2200. Pin-shaped conductor 2003 without a head part is sealed with a glass or glass ceramic material 2280 into base body 2200. After having been sealed into base body 2200 with glass or glass ceramic material 2280, pin-shaped conductor 2003 is inserted into opening 1130.1 as a complete component, for example in that base body 2200 of the feed-through, which consists, for example of aluminum, is joined, for example, through welding with strain-hardened cover part 1120 consisting of aluminum. Because of the sealing, only base body 2200 is softened. A recess 2002 in which an electrode connecting part 2020 is inserted is provided on the pin-shaped conductor. The electrode connecting component serves again either as cathode or as anode of electrochemical cell 2004 of battery cell 1000. Housing 1100 surrounds battery cell 1000 in the embodiment of battery cell housing.

As can be seen in FIG. 10a, based on the structure of feed-through 1140.1, 1140.2 with a pin-shaped conductor 2003 and an electrode connecting component which is inserted in recess 2002 of the pin-shaped conductor and which is to be connected with electrochemical cell 2004, a large space 2006 is associated which is created between electrochemical cell 2004 and cover 1120.

Due to the inventive structure of feed-through with pin-shaped conductor and head part as shown in FIGS. 11a and 11b, it is possible to minimize the unused space in the battery cell housing. Identical components as in FIGS. 10a and 10b are identified with reference numbers increased by 2000. Feed-throughs 3140.1, 3140.2 are again inserted in openings 3130.1, 3130.2 of cover 3120 of battery cell housing 3100. In contrast to the feed-through component of the feed-throughs illustrated in FIGS. 10a and 10b, the feed-through component is now provided with a pin-shaped conductor 3003 as well as with a head part 3005. The head part is equipped with an extension 3030, as well as with an electrode connecting component 3010 which is firmly attached to head part 3005 by welding, soldering or other previously described method. The electrode connecting component has a segment 3140, whereby segment 3140 serves as cathode or respectively anode for electrochemical cell 4004. As can be seen from FIGS. 11a to 11b the advantage of the inventive feed-through component is clearly recognizable. The configuration of the feed-through illustrated in FIGS. 11a through 11b determines that as little space as possible inside the battery cell housing remains unused.

The arrangement of the feed-through in FIGS. 11a and 11b is substantially consistent with the arrangement of the feed-through shown in FIGS. 6a to 6b. The description for FIGS. 6a to 6b is hereby accepted in its entirety into the current description of the battery cell.

Figure 12A:
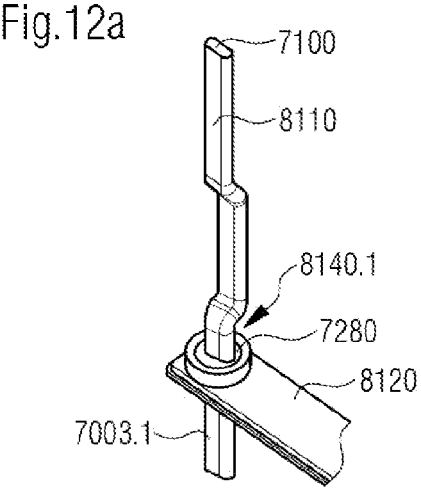
FIGS. 12a-12c illustrate a battery cell with a battery cell housing and a feed-through with feed-through component according to an additional embodiment of the present invention.
Figure 12B:
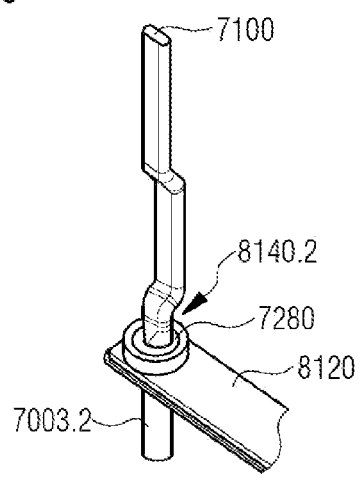
Figure 12C:
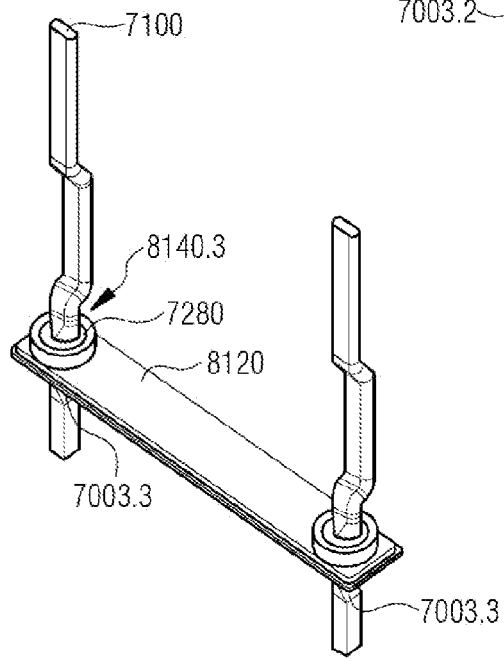

FIGS. 12a to 12c illustrate an additional arrangement of an inventive battery housing with a feed-through. Identical components as in the aforementioned drawings are identified with reference numbers increased by 5000. The embodiments illustrated in FIGS. 12a to 12c distinguish themselves in that the conductors, essentially pin-shaped conductors 7003.1, 7003.2, 7003.3 facing toward the battery cell do not have a round shape, that is they do not have a round cross section as shown for example in FIGS. 10a-11b, but instead have an essentially rectangular cross section 7100. Conductor 7003.1, 7003.2, 7003.3 moreover each has two bent locations. Conductor 7003.1, 7003.2, 7003.3 in principle already forms segment 8110 at its end which is facing toward the battery cell and which serves as cathode or respectively as anode for the electrochemical cell (not illustrated). In contrast to the embodiment according to FIGS. 11a and 11b where a separate electrode connecting component (identified with 3110 in FIG. 11b) is attached to the conductor, in particular the pin-shaped conductor, for example by welding, the electrode connecting component and the essentially pin-shaped conductor in the embodiments according to FIGS. 12a to 12 is a single-piece unit. This is advantageous from a manufacturing point of view since no two parts have to be connected with each other. Conductors 7003.1, 7003.2, 7003.3 distinguish themselves essentially through the cross sectional shape of the conductor in the region of feed-through 8140.1, 8140.2, 8140.3. In the arrangement according to FIG. 12a the cross section of the conductor in the region of seal 7280 is also essentially rectangular.

In the arrangement according to FIG. 12b the cross section is round instead of the rectangular cross section in the region of seal 7280. This conductor is identified with reference number 7003.2. In the embodiment according to FIG. 12b, the conductor features a round cross section facing the outside of the battery cell in contrast to the embodiment according to FIG. 12a.

In the arrangement according to FIG. 12c, the cross section in the region of seal 7280 is also round, like in FIG. 12b, however conductor 7003.3 is crimped in the region of connection to the outside of the battery housing and its cross section is therefore rectangular, for example square. In all of FIGS. 12a through 12c, the covers of the battery housings are identified with 8120, the base body into which conductor 7003.1, 7003.2, 7003.3 is sealed is identified with 8130.

The current invention cites for the first time a feed-through for a housing, in particular a battery cell housing, for example for a lithium-ion battery, which can be pre-manufactured and which is especially suited to be utilized in housing components of battery cell housings. The battery cell housing includes, for example, a light metal such as aluminum (Al), an aluminum alloy, AlSiC, magnesium, a magnesium alloy, titanium or a titanium alloy. However, metals such as steel or high-grade steel, in particular stainless steel or tool steel are possible as materials for the battery cell housing. In such a case the materials of the base body and/or the essentially pin-shaped conductor are adapted.

The inventive solution further allows reverting to a cost-effective manufacturing process and basic materials. Moreover, the entire feed-through can be in the embodiment of a pre-manufactured component into which the metal pin is sealed into a base body by a bonding material that is, for example a glass plug, before the base body is placed into the housing component. This ensures that there is no loss of strain-hardening in the housing component. Moreover, material thicknesses and materials for the housing component and the base body can be selected independently. The feed-through can be mechanically, as well as thermally, relieved through a special arrangement with a relief device.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A housing part of a housing having at least one opening, said housing part comprising:
   a feed-through placed in said at least one opening, said feed-through including:
   one of a glass material and a glass ceramic material;
   at least one conductor embedded in said one of a glass material and a glass ceramic material; and
   a base body through which said at least one conductor embedded in said one of a glass material and a ceramic material is guided, said base body including a relief device.

2. The housing part according to claim 1, wherein the housing is a battery housing.

3. The housing part according to claim 2, wherein the housing part is a metal.

4. The housing part according to claim 3, wherein said metal is a light metal.

5. The housing part according to claim 4, wherein the metal is one of aluminum, an aluminum alloy, aluminum silicon carbide (AlSiC), magnesium, a magnesium alloy, titanium, a titanium alloy, steel, stainless steel and a high-grade steel.

6. The housing part according to claim 1, wherein said base body is an essentially ring-shaped base body.

7. The housing part according to claim 1, wherein said at least one conductor is an essentially pin-shaped conductor.

8. The housing part according to claim 7, wherein a material of said essentially pin-shaped conductor and said base body are a metal.

9. The housing part according to claim 8, wherein said material of said essentially pin-shaped conductor is one of copper, copper silicon carbide (CuSiC), a copper alloy, aluminum, aluminum silicon carbide (AlSiC), an aluminum alloy, magnesium, a magnesium alloy, nickel-iron (NiFe), a NiFe jacket with a copper core, silver, a silver alloy, gold, a gold alloy and a cobalt-iron alloy and said material of said base body is one of aluminum, AlSiC, an aluminum alloy, steel, stainless steel, high-grade steel, tool steel, magnesium, a magnesium alloy, titanium and a titanium alloy.

10. The housing part according to claim 7, wherein an additional material which is one of a glass and a glass ceramic material is introduced between said base body and said at least one conductor.

11. The housing part according to claim 10, wherein said additional material which is one of a glass and a glass ceramic material has a sealing temperature which is lower than a melting temperature of at least one of said base body and said conductor.

12. The housing part according to claim 7, wherein said essentially pin-shaped conductor includes a head part having a head surface which is larger than a surface of said pin-shaped conductor.

13. The housing part according to claim 12, wherein at least one of said head part and said pin-shaped conductor has a round or an oval external form and said one of a glass material and a glass ceramic material is positioned between said pin-shaped conductor and said base body or between said head part and said base body.

14. The housing part according to claim 1, wherein said base body is in a region of said at least one opening and is hermetically sealed with the housing part by one of welding, soldering, pressing, crimping and shrinking.

15. The housing part according to claim 1, wherein said relief device includes at least one of a groove and a protrusion.

16. The housing part according to claim 1, wherein said one of glass material and glass ceramic material includes the following in Mole percent (mol-%):
   $P_2O_5$ 35-50 mol-%;
   $Al_2O_3$ 0-14 mol-%;
   $B_2O_3$ 2-10 mol-%;
   $Na_2O$ 0-30 mol-%;
   $M_2O$ 0-20 mol-%, said M being one of K, Cs and Rb;
   PbO 0-10 mol-%;
   $Li_2O$ 0-45 mol-%;
   BaO 0-20 mol-%; and
   $Bi_2O_3$ 0-10 mol-%.

17. The housing part according to claim 16, wherein said one of glass material and glass ceramic material includes the following in mol-%:
   $Li_2O$ 17-40 mol-%;
   BaO 5-20 mol-%; and
   $Bi_2O_3$ 2-5 mol-%.

18. The housing part according to claim 1, wherein the housing part has an outside and an inside, said base body being connected with one of said inside and said outside of the housing.

19. The housing part according to claim 18, wherein said connection is one of a welding connection, a soldering connection and a connection by pressing in.

20. A housing part of a housing having at least one opening, said housing part comprising:
   a feed-through placed in said at least one opening, said feed-through including:
   one of a glass material and a glass ceramic material;
   at least one conductor embedded in said one of a glass material and a glass ceramic material; and
   a base body through which said at least one conductor embedded in said one of a glass material and a ceramic material is guided, and wherein said one of glass material and glass ceramic material includes the following in mol-%:
   $P_2O_5$ 39-48 mol-%;
   $Al_2O_3$ 2-12 mol-%;

B$_2$O$_3$ 4-8 mol-%;
Na$_2$O 0-20 mol-%;
M$_2$O 12-20 mol-%, said M being one of K, Cs and Rb;
PbO 0-9 mol-%;
Li$_2$O 0-20 mol-%;
BaO 0-20 mol-%; and
Bi$_2$O$_3$ 1-5 mol-%.

21. A housing part of a housing having at least one opening, said housing part comprising:
    a feed-through placed in said at least one opening, said feed-through including:
        one of a glass material and a glass ceramic material;
        at least one conductor embedded in said one of a glass material and a glass ceramic material; and
    a base body through which said at least one conductor embedded in said one of a glass material and a ceramic material is guided, and wherein said one of glass material and glass ceramic material includes the following in mol-%:
P$_2$O$_5$ 38-50 mol-%;
Al$_2$O$_3$ 3-14 mol-%;
B$_2$O$_3$ 4-10 mol-%;
Na$_2$O 10-30 mol-%;
K$_2$O 10-20 mol-%; and
PbO 0-10 mol-%.

22. The housing part according to claim 21, wherein said one of glass material and glass ceramic material includes the following in mol-%:
P$_2$O$_5$ 39-48 mol-%;
Al$_2$O$_3$ 4-12 mol-%;
B$_2$O$_3$ 4-8 mol-%;
Na$_2$O 14-20 mol-%;
K$_2$O 12-19 mol-%; and
PbO 0-9 mol-%.

23. A storage device, comprising:
    a housing, a part of said housing having at least one opening and including:
        a feed-through placed in said at least one opening, said feed-through including:
            one of a glass material and a glass ceramic material;
            at least one conductor embedded in said one of a glass material and a glass ceramic material; and
        a base body through which said at least one conductor embedded in said one of a glass material and a ceramic material is guided, said base body including a relief device.

24. The storage device according to claim 23, wherein said storage device is a battery.

25. The storage device according to claim 24, wherein said battery is a lithium-ion battery.

26. The storage device according to claim 23, wherein said storage device is a lithium-ion accumulator.

27. A method for producing a housing part for a housing, the method comprising the steps of:
    providing a conductor and a base body;
    embedding said conductor in one of a glass material and a glass ceramic material and sealing said embedded conductor into said base body to form a feed-through for the housing part;
    connecting said feed-through with the housing part, said one of a glass material and a glass ceramic material including the following in mol-%:
P$_2$O$_5$ 39-48 mol-%;
Al$_2$O$_3$ 2-12 mol-%;
B$_2$O$_3$ 4-8 mol-%;
Na$_2$O 0-20 mol-%;
M$_2$O 12-20 mol-%, wherein M is one of K, Cs and Rb;
PbO 0-9 mol-%;
Li$_2$O 0-40 mol-%; and
Bi$_2$O$_3$ 1-5 mol-%.

28. The method according to claim 27, wherein said conductor is an essentially pin-shaped conductor.

29. The method according to claim 27, wherein the housing is a battery cell housing.

30. The method according to claim 27, wherein said connecting step is with one of welding, soldering, shrinking, pressing and flanging.

31. The method according to claim 30, wherein said welding is one of laser welding, electron beam welding, ultrasonic welding and resistance welding.

32. The method according to claim 27, wherein said one of a glass material and a glass ceramic material includes the following in mol-%:
Li$_2$O 17-40 mol-%;
BaO 5-20 mol-%; and
Bi$_2$O$_3$ 2-5 mol-%.

33. A method for producing a housing part for a housing, the method comprising the steps of:
    providing a conductor and a base body;
    embedding said conductor in one of a glass material and a glass ceramic material and sealing said embedded conductor into said base body to form a feed-through for the housing part; and
    connecting said feed-through with the housing part, wherein said one of a glass material and a glass ceramic material includes the following in mol-%:
P$_2$O$_5$ 38-50 mol-%;
Al$_2$O$_3$ 3-14 mol-%;
B$_2$O$_3$ 4-10 mol-%;
Na$_2$O 10-30 mol-%;
K$_2$O 10-20 mol-%; and
PbO 0-10 mol-%.

34. The method according to claim 33, wherein said one of a glass material and a glass ceramic material includes the following in mol-%:
P$_2$O$_5$ 39-48 mol-%;
Al$_2$O$_3$ 4-12 mol-%;
B$_2$O$_3$ 4-8 mol-%;
Na$_2$O 14-20 mol-%;
K$_2$O 12-19 mol-%; and
PbO 0-9 mol-%.

35. A housing part of a housing having at least one opening, said housing part comprising:
    a feed-through placed in said at least one opening, said feed-through including:
        one of a glass material and a glass ceramic material;
        at least one conductor embedded in said one of a glass material and a glass ceramic material; and
    a base body through which said at least one conductor embedded in said one of a glass material and a ceramic material is guided, wherein said base body is in a region of said at least one opening and is hermetically sealed with the housing part such that a helium leakage rate is smaller than $1\cdot10^{-8}$ mbar l/sec, said base body including a relief device.

36. The housing part according to claim 35, wherein said relief device includes at least one of a groove and a protrusion.

* * * * *

UNITED STATES PATENT AND TRADEMARK OFFICE
CERTIFICATE OF CORRECTION

PATENT NO. : 9,616,518 B2
APPLICATION NO. : 13/967870
DATED : April 11, 2017
INVENTOR(S) : Frank Kroll et al.

It is certified that error appears in the above-identified patent and that said Letters Patent is hereby corrected as shown below:

In the Specification

Column 10
At Line 1, please delete "expansion a", and substitute therefore --expansion α--.

Column 11
At Line 48, please delete "expansion a", and substitute therefore --expansion α--.

Signed and Sealed this
Third Day of July, 2018

Andrei Iancu
*Director of the United States Patent and Trademark Office*